April 3, 1956
CHANG-KAING TSAI
2,740,864
PRECISION THERMOSTATIC SWITCH
Filed Jan. 5, 1953
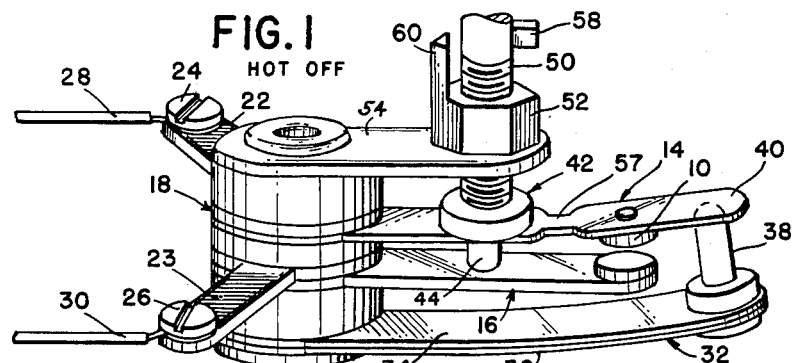
FIG. 1 HOT OFF
FIG. 2
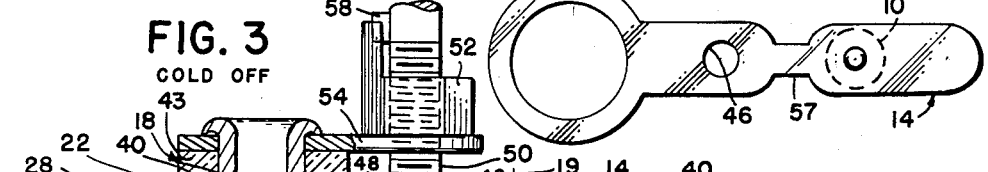
FIG. 3 COLD OFF
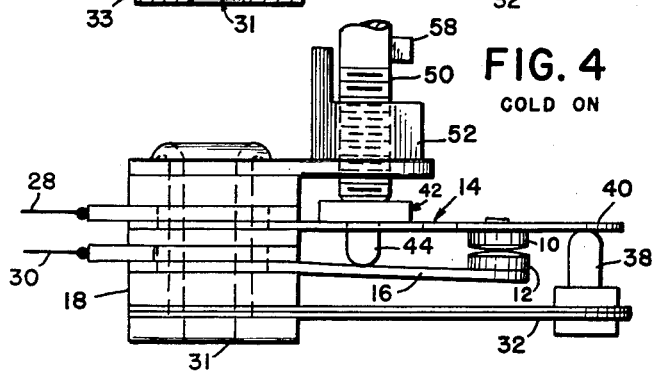
FIG. 4 COLD ON
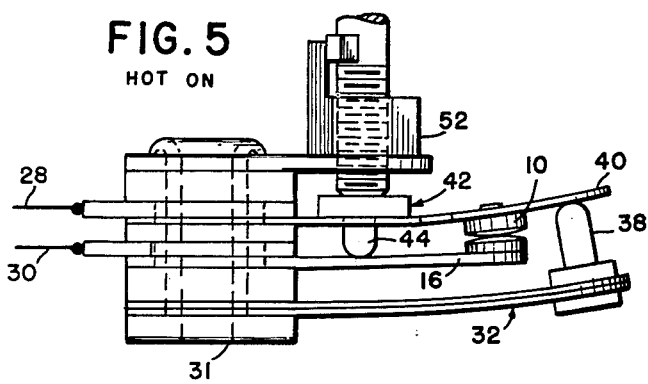
FIG. 5 HOT ON
INVENTOR
CHANG-KAING TSAI
BY William C. Strueber ATTORNEY

United States Patent Office 2,740,864
Patented Apr. 3, 1956

2,740,864

PRECISION THERMOSTATIC SWITCH

Chang-Kaing Tsai, Minneapolis, Minn., assignor to General Mills, Inc., a corporation of Delaware Application January 5, 1953, Serial No. 329,512

5 Claims. (Cl. 200—138)

This invention relates to improvements in thermostatic switches which control an electric circuit in response to changes in temperature.

With the use of an electrical circuit to provide heat for use in heating a member, such as an appliance, a tool, or for general heating, an automatic switch is commonly provided to control the flow of electricity to the element and thereby control the temperature produced by the heating element. In a small home appliance, it is desirable for such a switch to be small and take up little operational space and also be economical to construct in having a minimum of parts which are easy to assemble. Another very important requirement is that the switch be accurate. It, of course, follows that the parts must retain their accuracy over long periods of use. A basic type of thermostatic switch used with small appliances has switch arms carrying contacts and arranged so that the contacts are broken by a bi-metallic arm which changes position when heated to push one of the switch arms away from the other to separate the contacts. To adjust the thermostatic switch, the position of the contact arms with respect to the bi-metallic arm is changed.

It has been found that for increased contact life, there is an optimum contact pressure which must be used. This is especially difficult to maintain since adjustment requires change in switch arm position. Heretofore, attempts to achieve a thermostat switch which would maintain a constant contact pressure with adjustment have resulted in requiring additional parts and have increased costs of parts and time of assembly. Further, stability of structure has to be sacrificed, resulting in the possibility of the switch losing its accuracy in a shorter period of time.

Another advantage attained by a thermostat having a constant contact pressure is that the same pressure is required of the bi-metallic arm to separate the contact, regardless of contact setting. With constant contact pressure, there need be no allowances made for variance in pressure required of the bi-metallic arm to separate the contacts. This, of course, will increase the accuracy of the switch.

An object of the present invention is to provide a thermostatic control switch of the simple construction which achieves a high accuracy of performance and which has a long contact life and in which adjustment of operating temperature may be freely made without changing the pressure between the switch contacts and therefore without altering the force needed to open the switch.

Other objects and advantages will become more apparent in the following specification taken in connection with the accompanying drawings, in which—

Figure 1 is a perspective view of the thermostatic switch showing the elements as they are positioned when the bi-metallic arm is hot and has moved the switch contacts to off position or simply when the switch is in the hot, off position;

Fig. 2 is a plan view of the upper switch arm showing it removed from the switch assembly;

Fig. 3 is a side elevation, partially in section, of the thermostatic switch in cold, off position;

Fig. 4 is a side elevation of a thermostatic switch in the cold, on position; and Fig. 5 is a side elevation of a thermostatic switch in the hot, on position.

Showing the preferred embodiment of the invention, Fig. 1 illustrates the switch assembly elements as they are positioned when the switch is hot and the contacts are separated in off position. The electrical contacts 10 and 12 are carried by upper and lower switch arms 14 and 16. These contacts carried on the free ends of the switch arms break the electric circuit when in engagement. The contacts are suitably attached to the arms, such as is shown in the detail of the switch arms 14 in Fig. 2. The other ends of the switch arms are suitably mounted in a base member or mounting post, shown generally at 18. The switch arms are of a spring material and are therefore resilient. They are constructed to have a natural bias, as indicated by the force arrows 19, 20, 21 (Fig. 3), the function of which will be later explained in detail. As secured in the post, they are electrically insulated from each other and have terminals 22 and 23. The terminals carry screws 24 and 26 by means of which wires 28 and 30 may be connected to the terminals. The wires lead from a source of electricity to a heating element which may be of varied types and, since the details form no part of the present invention, they are not shown.

The supporting post 18 which forms a common support for the switch arms and the bi-metallic arm is shown in detail in Fig. 3. The main portion of the support is a central hollow rivet 31 which has a flanged lower end 33 upon which the bi-metallic arm 32 rests. In assembly, the bi-metallic arm and switch arms are constructed with a hole on their base ends so that they may be dropped over the central rivet. The upper arm is shown as an example in Fig. 2.

After the bi-metallic arm has been slid over the rivet, an insulating ring 35 is placed over the rivet and holds the bi-metallic arm tightly against the lower flanged end 33 of the rivet. This ring 35 may be formed of porcelain, or the like, which is electrically insulating and also impervious to heat. The ring 35 has an upper reduced portion 37 which forms a shoulder where it meets the main body for supporting the lower switch arm 16.

After the switch arm 16 is dropped over the reduced portion 37 of the ring, terminal arm 23 is placed so that it will rest upon the lower switch arm so as to be in electrical contact therewith.

Resting on top of the annular ring 35 is another similar ring 39 which has an upper reduced portion 40 providing a shoulder upon which rests the upper switch arm 14 and the terminal arm 22 in the order given. A final insulating ring 43 is placed over the terminal arm to hold the terminal and upper switch arm against the shoulder of the ring 39. When the upper annular ring 39, the upper arm 14, and the terminal arm 22 are assembled on the rivet in that order, to complete the assembly, a bracket 54 is slipped over the rivet and it is flanged over to hold the elements tightly together.

The common central post 18 serves as a simple secure mounting support for all of the operating elements of the thermostatic switch. The assembly may be easily placed in the appliance in which it is to be used by fixing the post in the proper place.

At the base of the post 18 is secured the bi-metallic arm 32 which is responsive to changes in temperature. The temperature responsive arm is bi-metallic, being formed of two layers of different metals which have different thermal co-efficients of expansion. As shown in Fig. 1, the upper layer 34 of the bi-metallic arm has a lower co-efficient of expansion than the lower layer 36 and therefore as the bi-metallic arm is subjected to heat, the arm curves upwardly since the lower layer expands more rapidly than the upper layer.

To utilize this change with variation in temperature, the bi-metallic arm is arranged so that its bending will separate the switch contacts and break the circuit. It is to be understood that in the preferred embodiment shown, the wires 28 and 30 will complete the circuit to a heating element. Therefore, to operate as a control switch, this circuit should be broken when a certain set temperature is reached and re-made when the temperature falls below this certain temperature. Other arrangements, however, may be used to control the circuit to the heating element. For example, the bi-metallic element could be arranged to close the contacts as the temperature increases to thereby operate a relay which will open the circuit to the leading elements. The bi-metallic arm may, therefore, close the contacts with heat and it could be arranged to engage either of the switch arms. Since these and other variations will be obvious with the teachings of the present invention to those skilled in the art, it is to be understood that the present invention is to cover apparent modifications.

To open the switch, the bi-metallic arm engages the upper switch arm and raises it to cause a separation of the contacts. For this purpose, an insulating pin 38 is secured to the end of the bi-metal arm. This pin strikes the end of the upper arm 14 as the bi-metal curves with heat and the upper arm is extended so as to be longer than the lower arm in order that its projected end 40 will be in the path of travel of the pin 38.

The upper switch arm 14 is made of spring material with a natural resilience so that its outer end is biased downwardly to urge its contact against the contact of the lower arm 12. This bias is indicated by the face arrow 19 in Fig. 2. When the pin 38 of the bi-metallic arm strikes the upper switch arm, it will carry it upwardly against this biasing force to separate the contacts.

The lower switch arm 16 is also resilient by nature but preferably is stronger than the upper switch arm so that it will not bend appreciably downwardly when the contacts 10 and 12 engage and, of course, will not follow the upper contact arm when it is bent away from it. The direction of natural bias of the lower contact is indicated by the force arrow 21.

It has been found that there is an optimum contact pressure which must be used to obtain the utmost in contact life. This contact pressure may be determined by the strength of bias of the upper switch arm. With a given resiliency the bias strength will change as the arms are moved toward or away from each other. With the present invention the midpoints of the switch arms are kept spaced a constant and fixed distance regardless of the position to which the arms are adjusted.

An important feature of the invention is found in this structure which keeps the two contact arms a constant distance apart at their midpoint. The element which aids in this accomplishment is the spacer member. The spacer member is made of an insulating material so that it will not short the two switch arms. The spacer member has a lower projecting pin 44 which extends through a hole 46 (Figs. 2 and 3) in the upper switch arm. The lower tip of the pin of the spacer member bears against the lower switch arm. The lower switch arm is of spring material and hence is resilient. The arm is constructed so that the lower arm is biased to force itself upwards against the tip 44 of the spacing member, as indicated by arrow 21. The upper portion of the spacing member carries an annular flange 48 which extends over the edge of the hole in the upper switch member. The upper switch member has a natural bias from the mounting post to the spacer 42 which biases it upwardly against the flange of the spacing member, as indicated by the force arrow 20. Between the spacer member and the contact point the bias is downwardly as shown by arrow 19. The spacing member is pushed upwardly by both switch arms and abuts against the adjustment member 50. The adjustment member is threaded into a nut 52 mounted on the bracket 54 which is secured to the main post 18. Rotation of the adjustment member will screw it up or down to determine its position.

Thus the resilience of the lower switch arm 16 causes it to be biased against the lower tip of the spacing member, as indicated by the arrow 21, and the natural resilience of the upper switch arm causes it to be biased against the flange of the spacing member, as indicated by the arrow 20. Since the member is held downwardly by the adjusting member 50, the position of the resilient switch arms is determined by the position of the adjusting member.

It will be recognized that the structure of the present invention employs very few parts and is easily assembled. Yet it achieves an adjustable thermostat with a constant pressure which may be rigidly mounted in any appliance.

An example of a cycle of operation of the thermostatic switch is illustrated by observing in sequence Figs. 3, 4, 1 and 5. In Fig. 3, the contacts 10 and 12 are separated although the bi-metallic arm 32 is straight and the switch is turned off. This separation of contacts has been accomplished by screwing down the adjusting member 50 to the off position which forces the switch arms 14 and 16 downwardly to where the extension 40 of the upper switch arm strikes the pin 38. The pin holds the upper switch arm, forcing the contacts apart as the adjusting member carries the arms downwardly.

To turn the heating element on to complete the electrical circuit, the adjustment member 50 is rotated to raise it and permit the upper and lower switch arms 14 and 16 to raise. This draws the end 40 of the upper switch arm away from the operating pin 38 to permit the contacts 10 and 12 to move together, as shown in Fig. 4. With the circuit thus completed, the heating element begins to heat.

As the heating element heats and the bi-metallic arm 32 gains heat, it begins to curve, as shown in Fig. 1, until it carries its pin 38 up against the end 40 of the upper switch arm 14. This bends the arm 14 upwardly about the narrow portion 57 of the blade. This portion 57 of the switch arm is narrowed to obtain the proper bias of the end of the switch arm. Because of the short distance between the intermediate point where the spacing member 42 is positioned and the contact point 10, the switch arm should be reduced to decrease the resistance of the arm to bending by the force of the bi-metallic arm.

The contacts remain separated, breaking the circuit until the heating element begins to cool with the consequent cooling of the bi-metallic arm 36. As this arm cools, it begins to straighten out to where it again achieves the position of Fig. 4, whereupon the circuit is again closed to cause a re-heating of the heating element. Re-heating again causes a curving of the bi-metallic arm 32 with an opening of the contacts, as shown in Fig. 1. This cycle will continue until the adjustment is changed by raising or lowering the adjustment member 50.

The adjustment member is used when it is desirable to have the circuit to the heating element broken at a lower or at a higher temperature to thus change the temperature level at which the heating element will remain. If, for example, the temperature level is to be increased, the adjustment member 50 is raised by rotating it and screwing it upwardly through the nut 52. This withdrawal of the adjustment member will permit the switch arms 14 and 16 to move upwardly, drawing the extension 40 upwardly away from the pin 38. If adjustment to a higher temperature is made when the switch is open, as shown in Fig. 1, the adjustment will move the elements to the position of Fig. 5. It will be seen in that figure that the bi-metallic arm is still bent upwardly but the contacts have closed. This is due to the fact that both switch arms have followed the spacer member 42 upwardly as the adjustment member 50 is withdrawn. Since the outer portion of the arm 14 is resiliently biased downwardly, it does not move up but continues to push against the pin 38 and thus the contact 12 of the lower switch arm moves upwardly to meet the contact 10 of the upper arm and close the circuit.

To set the thermostat to a lower heat, the adjustment member 50 would be turned downwardly in the nut 52 so that the relative position of the elements will change from that shown in Fig. 5 to that shown in Fig. 1. Further rotation of the threaded adjustment member 50 will move the elements to the position of Fig. 3, completely turning off the control switch, so the contacts will not close even if the bi-metal arm moves to the cooled straight position.

To maintain the adjustment member in the proper rotational orientation so that the switch setting may be known and to prevent damaging the switch arms by turning the rotational adjustment member too far, a stop 58 is provided. This stop, when the adjustment member is rotated too far to the right or left, strikes a projection 60 on the nut 52 which prevents further rotation of the adjustment member.

It is to be noted that as the adjusting member moves up and down and the switch arms move up and down with it, the spacing or distance between the intermediate point of the switch arms always remains constant, being determined by the length of the pin 44 of the spacing member. Thus the contact pressure will also always be constant.

It will be seen from the drawings that when the insulated pin 38 of the bi-metallic bar strikes the end of the upper switch arm, the arm always bends between the spacing member 42 and the pin. When the adjusting member 50 is turned up or down, the bending which occurs in the upper switch arm occurs between spacing member 42 and the mounting post 18, creating no change in the bias on the free end of the switch arm. Because of this, the resistance which the free end of the switch arm will offer to the insulating pin of the bi-metallic arm will always be the same no matter what adjustment is made of the thermostat.

By using the present structure which has constant contact pressure, a greater degree of accuracy is achieved in that the bi-metallic arm will always open the switch with the same amount of effort and therefore allowance need not be made for the position of the adjustment member and there will be no lag in opening of the switch due to increased resistance against the action of the bi-metallic arm.

The provision of a highly accurate thermostat which opens with a constant resistance against the action of the bi-metallic arm, regardless of the setting, has been accomplished with a very simple structure and without the addition of extra mechanism which would increase complexity and assembly costs. The apparatus uses a minimum of parts and a single common mounting post is used for the support of both the switch arms and the bi-metallic arm in addition to functioning as a support for the bracket for the adjustment member. The spacing member which keeps the midpoint of the switch arms a constant distance apart, regardless of the thermostat setting, is simple in structure and is easy to assemble by merely dropping it in the hole in the upper blade. It need not be subjected to tests for extreme high accuracy of manufacture, since minor discrepancies in size may be compensated for by the setting of the adjustment member.

Thus it will be seen that I have by my invention provided an improved thermostat which is efficient and accurate and which meets the objectives set forth in the opening of the specification.

I have, in the drawings and specification, presented a detailed disclosure of the preferred embodiment of my invention, but it is to be understood that as the invention is susceptible of modifications, structural changes and various applications of use within the spirit and scope of the invention, I do not intend to limit the invention to the specific form disclosed but intend to cover all modifications, changes and alternative constructions and methods falling within the scope of the principles taught by my invention.

I claim as my invention:

1. A precision thermostatic switch for changing the condition of a circuit in response to change in temperature comprising a first and second switch arm arranged to be co-extensive and spaced from each other, contact points at an end of the arms, a mounting post to which the arms are secured at their other ends, a bi-metallic temperature responsive arm also secured to the post and substantially co-extensive with and spaced from the arms and arranged to have a free end engage the first of the switch arms to move it with respect to the second switch arm with temperature change, and means for positively changing the position of a midpoint of both of the switch arms with respect to the temperature responsive arm to bend the switch arms between the post and their midpoint without changing the resistance of the first switch arm to the bi-metallic arm.

2. A precision thermostatic switch for changing the condition of a circuit in response to changes in temperature comprising first and second switch arms with contact points at one end, a mounting base for securing the arms at the other end, a temperature responsive arm fixed to the base at one end and engaging one of the switch arms to change its position with respect to the other switch arm with changes in temperature, and an adjustment member bearing against both the first and second switch arms at a point intermediate their ends and adjustable toward or away from the temperature responsive arm to change the position of the switch arms and change the point at which the switch arm will be engaged, the first switch arm being biased toward the adjustment member and the second switch arm also being biased toward the adjustment member so that they will follow the member when it moves with respect to the temperature responsive arms.

3. A precision thermostatic switch for changing the condition of a circuit with changes in temperature comprising a first resilient switch arm with a hole therethrough intermediate the ends and a second resilient switch arm, the arms having contact points at one end, a base for securing the arms at the other end, a temperature responsive arm fixed to the base at one end and engageable with one of the switch arms with movement to change its position with respect to the other arm with change in temperature, a spacer member extending through the hole in the first switch arm to bear against the second arm and having a flanged end larger than said hole preventing movement of the first arm with respect to the spacer member, both arms being biased against the spacer member, and an adjustment member engaged with the flanged end of the spacer member so that movement of the adjustment member will change the position of the intermediate points of the switch arms without changing the distance between the arms.

4. A precision thermostatic switch for changing the condition of a circuit with change in temperature comprising a first resilient switch arm and a second resilient switch arm, the arms having interengaging contact points at one end, a fixed base for securing the arms at the other ends, a temperature responsive device fixed to the base at one end and engaging the free end of the first switch arm to change its position with respect to the second arm, an adjustment member engaging an intermediate point of both switch arms and adjusting their position relative to the temperature responsive device without changing the spacing of the arms at the intermediate point, said first arm having a reduced portion between the contact point and the intermediate point and flexing about the reduced portion when engaged by the temperature responsive device.

5. A precision thermostatic switch for changing the condition of a circuit with change in temperature comprising a first resilient switch arm and a second resilient switch arm, the arms having interengaging contact points at one end being normally in engagement, a base for securing the arms at the other ends, a temperature responsive arm secured to said base and flexible with changes in temperature to engage the free end of the first switch arm and force it away from the second arm to break contact between the contact points, and an adjustment member bearing against both switch arms at a point intermediate their ends and movable toward or away from the switch arms to change their position with respect to the temperature responsive arm, the first and second arms being biased against the adjustment member and the first arm being biased toward the second arm between said intermediate point and the free end.

References Cited in the file of this patent
UNITED STATES PATENTS

| | | |
|---|---|---|
| 708,539 | Fell | Sept. 9, 1902 |
| 2,500,760 | Lee | Mar. 14, 1950 |
| 2,518,595 | Bletz | Aug. 15, 1950 |
| 2,566,198 | Hem | Aug. 28, 1951 |
| 2,566,270 | Weiland | Aug. 28, 1951 |